(12) United States Patent
Wright

(10) Patent No.: US 10,898,743 B2
(45) Date of Patent: Jan. 26, 2021

(54) VENTILATION CLOSURE SYSTEM

(71) Applicant: THE BOEING COMPANY, Chicago, IL (US)

(72) Inventor: Robert Steven Wright, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 163 days.

(21) Appl. No.: 16/191,156

(22) Filed: Nov. 14, 2018

(65) Prior Publication Data

US 2020/0147425 A1    May 14, 2020

(51) Int. Cl.
*A62C 2/06* (2006.01)
*A62C 3/06* (2006.01)
*F03G 7/06* (2006.01)
*F16K 31/00* (2006.01)

(52) U.S. Cl.
CPC ............... *A62C 3/14* (2013.01); *A62C 3/06* (2013.01); *F03G 7/065* (2013.01); *F16K 31/002* (2013.01)

(58) Field of Classification Search
CPC .. A62C 3/14; A62C 3/06; F03G 7/065; F16K 31/002
USPC ........ 169/45, 46, 48, 49, 52, 54, 60, 62, 65; 160/1, 44, 23.1; 454/369; 236/49.2; 49/1, 7
See application file for complete search history.

(56) References Cited

U.S. PATENT DOCUMENTS

| | | | |
|---|---|---|---|
| 4,066,064 A * | 1/1978 | Vandas | A62C 2/241 169/65 |
| 4,817,912 A * | 4/1989 | McCabe | A62C 2/06 236/49.2 |
| 4,958,687 A * | 9/1990 | Nakagawa | A62C 2/12 169/60 |
| 6,175,989 B1 | 1/2001 | Carpenter et al. | |
| 6,889,411 B2 | 5/2005 | Hinkley et al. | |
| 9,897,159 B2 * | 2/2018 | Marble | F16F 9/523 |
| 2011/0308825 A1 | 12/2011 | Lee | |

(Continued)

FOREIGN PATENT DOCUMENTS

| | | |
|---|---|---|
| JP | 2016147022 A | 8/2016 |
| KR | 101559862 B1 | 10/2015 |

OTHER PUBLICATIONS

European Search Report for Application No. 19208778.1 dated Mar. 26, 2020, 9 pgs.

*Primary Examiner* — Steven J Ganey

(74) *Attorney, Agent, or Firm* — Moore Intellectual Property Law, PLLC

(57) ABSTRACT

A ventilation closure system includes a damper, a shape memory alloy actuator, and a heating device. The shape memory alloy actuator is coupled to the damper. The shape memory alloy actuator has a first state in which the damper is positioned to permit airflow in the duct and has a second state in which the damper is positioned to obstruct the airflow in the duct. The shape memory alloy actuator is configured to change from the first state to the second state responsive to the shape memory alloy actuator attaining a first temperature responsive to heat released by an exothermic reaction in a compartment associated with the duct. The heating device is configured to heat the shape memory alloy actuator to maintain the damper in a position that obstructs the airflow in the duct.

20 Claims, 9 Drawing Sheets

(56) References Cited

U.S. PATENT DOCUMENTS

2014/0020673 A1\* 1/2014 Zank .................... A62C 31/02
169/65
2018/0318617 A1 11/2018 Henderson et al.

\* cited by examiner

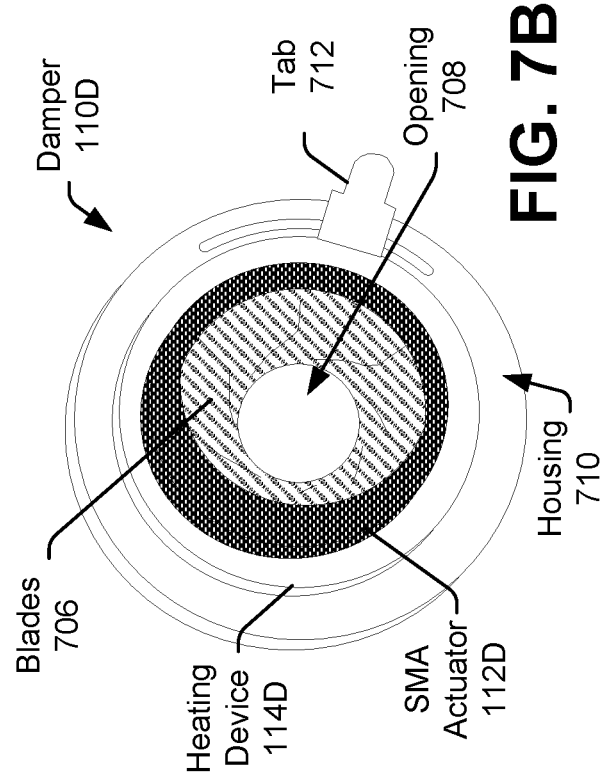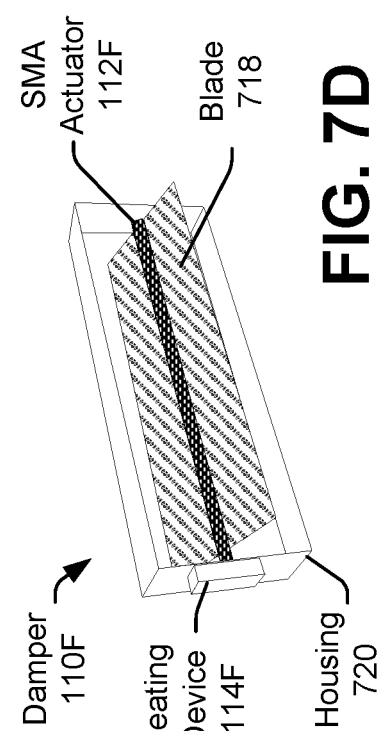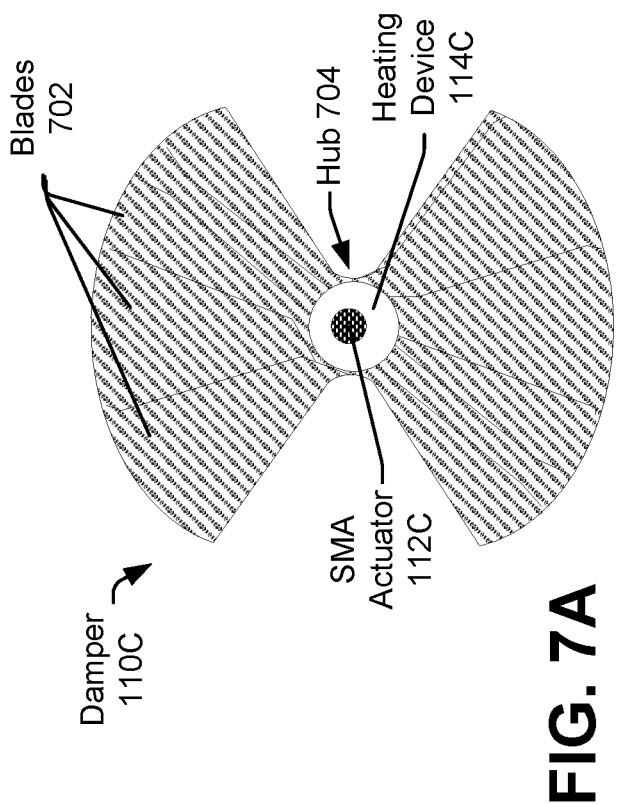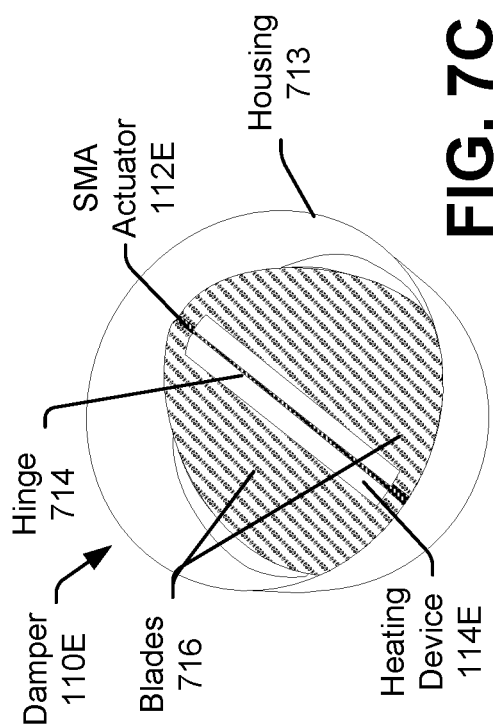

VENTILATION CLOSURE SYSTEM

FIELD OF THE DISCLOSURE

The present disclosure is generally related to ventilation shutoff systems and dampers with shape memory alloy actuators.

BACKGROUND

One concern associated with storage and use of flammable and combustible materials is the potential for ignition of such materials. Ignition generally requires conditions associated with the so-called "fire triangle," which describes the ingredients necessary to support a fire. The ingredients to support fire include a source of fuel (e.g., a combustible or flammable material), an oxidizer (e.g., oxygen), and an ignition source (e.g., heat). Depending on the particular fuel and oxidizer, sufficient energy for ignition can be supplied by a small spark, a hot surface, or even ambient conditions.

One approach to mitigating the risks associated with storage and use of flammable or combustible materials is to reduce the concentration of fuel by ventilating a compartment in which the flammable or combustible materials are stored to prevent vapor buildup. For example, air may be forced through the compartment to reduce the buildup of vapors within the compartment. However, in the event of ignition of the vapors or flammable or combustible materials, the airflow used for ventilation provides a significant source of oxygen, which can increase the rate of combustion of the flammable or combustible materials or spread the combustion beyond the compartment.

SUMMARY

In a particular implementation, a method of fire control for a compartment uses a damper coupled, via a shape memory alloy actuator, to a duct associated with the compartment. The shape memory alloy actuator has a first state in which airflow of the duct is unobstructed by the damper and has a second state in which the damper obstructs the airflow of the duct. The method includes, while the shape memory alloy actuator is in the first state, attaining, by the shape memory alloy actuator, a first temperature responsive to heat released by an exothermic reaction in the compartment. The method also includes, responsive to attaining the first temperature, changing, by the shape memory alloy actuator, from the first state to the second state to move the damper to obstruct airflow of the duct. The method further includes, after changing from the first state to the second state, heating the shape memory alloy actuator using a heating device coupled to the shape memory alloy actuator. The heating causes the shape memory alloy actuator to maintain the second state despite a reduction in heat released by the exothermic reaction.

In another particular implementation, a ventilation closure system includes a damper, a shape memory alloy actuator, and a heating device. The shape memory alloy actuator is coupled to the damper and configured to couple to a duct. The shape memory alloy actuator has a first state in which the damper is positioned to permit airflow in the duct and has a second state in which the damper is positioned to obstruct the airflow in the duct. The shape memory alloy actuator is configured to change from the first state to the second state responsive to the shape memory alloy actuator attaining a first temperature responsive to heat released by an exothermic reaction in a compartment associated with the duct. The heating device is configured to heat the shape memory alloy actuator to maintain the damper in a position that obstructs the airflow in the duct.

In another particular implementation, an assembly includes a ventilation closure system. The assembly includes a compartment and a duct configured to provide airflow to the compartment. The assembly also includes a damper, a shape memory alloy actuator, and a heating device. The shape memory alloy actuator is coupled to the damper and to the duct. The shape memory alloy actuator has a first state in which the damper is positioned to permit the airflow in the duct and has a second state in which the damper is positioned to obstruct the airflow in the duct. The shape memory alloy actuator is in thermal communication with the compartment and configured to change from the first state to the second state responsive to the shape memory alloy actuator attaining a first temperature responsive to heat released by an exothermic reaction in the compartment. The heating device is configured to, when activated, heat the shape memory alloy actuator. The assembly also includes control circuitry coupled to the heating device. The control circuitry is configured to selectively activate the heating device to maintain the damper in a position that obstructs the airflow in the duct.

The features, functions, and advantages described herein can be achieved independently in various implementations or may be combined in yet other implementations, further details of which can be found with reference to the following description and drawings.

BRIEF DESCRIPTION OF THE DRAWINGS

FIGS. 7A, 7B, 7C, and 7D are diagrams of examples of configurations of a damper, shape memory alloy, and heating device of the ventilation closure system of any of FIG. 1, 2, or 3;

DETAILED DESCRIPTION

Figure 1:
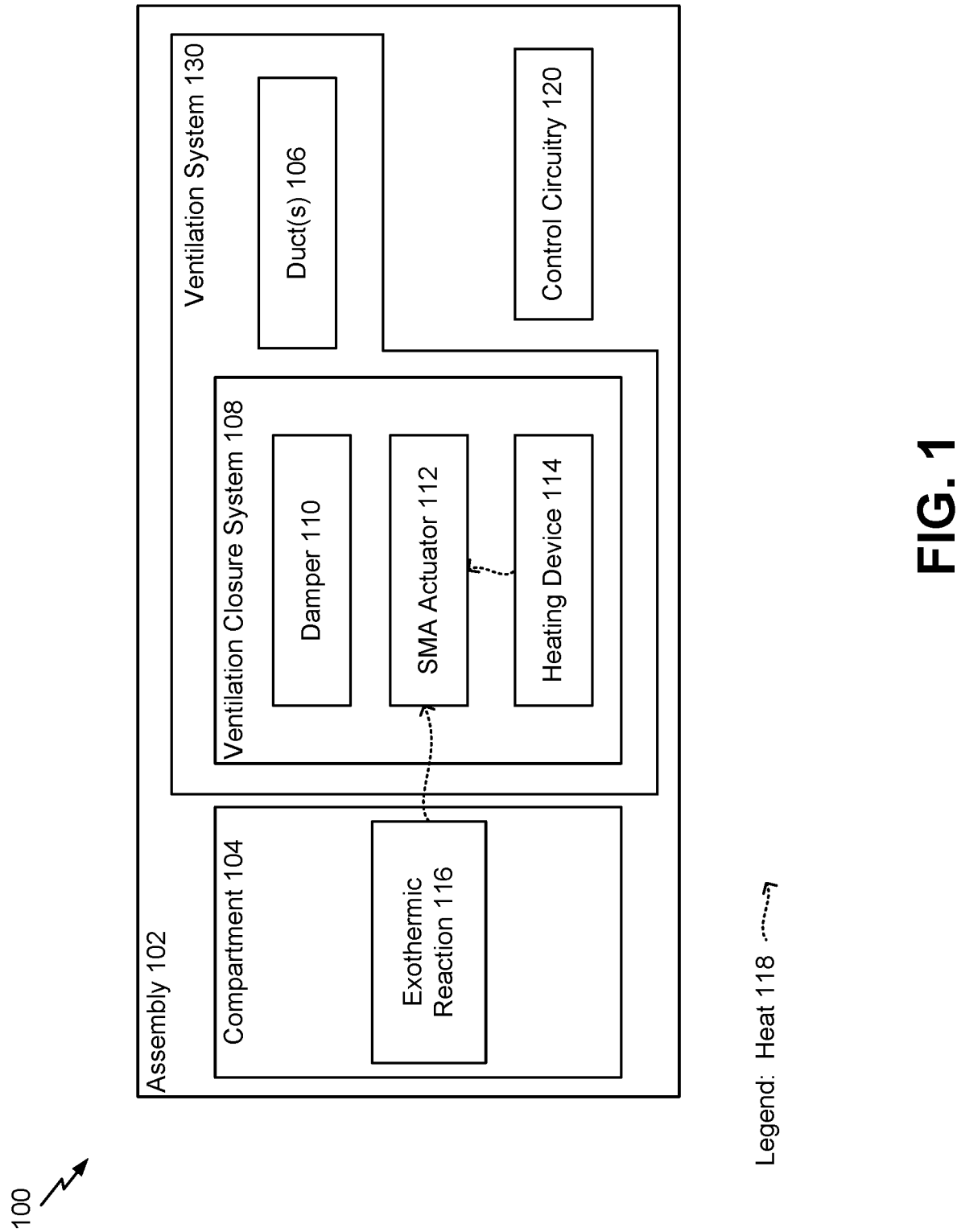
FIG. 1 is a diagram of an example of an assembly that includes a ventilation system and a ventilation closure system associated with a compartment.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 3, multiple ducts are illustrated and associated with reference numbers 106A and 106B. When referring to a particular one of these ducts, such as a first duct 106A, a distinguishing letter "A" is used. However, when referring to any arbitrary one of these ducts or to these ducts as a group, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. In some examples, such "generating", "calculating", "using", "selecting", "accessing", or "determining" is performed using processing circuitry. Such processing circuitry can include application specific circuits, programmable circuits (e.g., a processor or field-programmable gate array), and other components, such as memory. As used herein, a "control circuitry" refers to any type of processing circuitry, logic gates, or that circuitry that controls operation of a device, component, or circuit.

As used herein, "coupled" can include "communicatively coupled," "electrically coupled," "thermally coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. Two devices (or components) are thermally coupled if heat from one is transferred to the other, e.g., via conductive heat transfer, convective heat transfer, or radiative heat transfer. As used herein, "directly coupled" is used to describe two devices that are coupled (e.g., communicatively coupled, electrically coupled, thermally coupled, or physically coupled) without intervening components.

As used herein, fire and combustion are examples of exothermic reactions; however, the term "exothermic reaction" can include other types of chemical reactions that release heat. In the case of fire and/or combustion, the exothermic reaction is an oxidation reaction in which an oxidizer (e.g., oxygen) reacts with a fuel source to release heat. The exothermic reaction also releases reaction products (e.g., carbon dioxide, water, etc.) and may release or cause the release of reaction byproducts, such as partially oxidized fuel, particulate (e.g., smoke), chemical species formed by side reactions due to the heat release (e.g., various nitrogen oxides), etc.

In a particular implementation, a ventilation system is associated with a compartment to ventilate the compartment to prevent or mitigate the buildup of combustible or flammable vapors within the compartment. The ventilation system includes a passive or semi-passive ventilation closure system. In this context, a "passive ventilation closure system" refers to one or more devices that are configured to inhibit airflow through the ventilation system without intervention by a human or controller. In this context, a "semi-passive ventilation closure system" refers to one or more devices that are configured to inhibit airflow through the ventilation system without intervention by a human or controller and can also be activated in response to intervention by a human or controller. Stated another way, a semi-passive ventilation closure system is a passive ventilation closure system that can also be activated by a human or controller.

In a particular implementation, the ventilation closure system is configured to permit airflow through the compartment under normal circumstances (e.g., in the absence of fire or combustion conditions in the compartment) and is configured to obstruct airflow to the compartment responsive to initiation of combustion or another highly exothermic reaction. The oxidation of flammable and combustible materials tends to be highly exothermic, releasing significant heat into the ambient environment and surrounding materials. The ventilation closure system uses a shape memory alloy actuator coupled to a damper in order to close the damper responsive to significant increase in heat as a result of the exothermic reaction. Thus, the exothermic reaction itself can cause the damper to change positions via actuation of the shape memory alloy actuator in order to reduce or mitigate the exothermic reaction.

The shape memory alloy actuator is formed of a material (specifically, a "shape memory alloy") that changes shape (e.g., from a first state to a second state, or vice versa) responsive to heat. In general, the shape change of a shape memory alloy is due to a phase transition from a one crystal structure to another crystal structure. For example, the shape memory alloy (SMA) may have a martensite crystal structure at a lower temperature and may have an austenite crystal structure at a higher temperature. The SMA can deformed while in the martensite crystal structure (e.g., at low temperature). If the SMA is subsequently heated above a phase transition temperature (also referred to as a memory temperature), the SMA will return to the shape it had prior to deformation. Thus, the SMA is said to "remember" its shape prior to deformation. In some circumstances, an SMA can be trained to have two stable states (also referred to as having "two way memory"), where the SMA has a first state and a corresponding first shape while at a low temperature and has a second state and a corresponding second shape while at a high temperature. In this context, a "low temperature" is one that is below a memory temperature of the SMA and a "high" temperature is one that is above the memory temperature of the SMA.

In particular implementations disclosed herein, the SMA actuator is configured to have a particular high temperature state (referred to herein as a "second state") that causes the SMA actuator to at least partially close a damper of the ventilation closure system responsive to heat. Additionally, the SMA actuator is configured to have a particular low temperature state (referred to herein as a "first state") that causes the SMA actuator to position the damper to permit airflow through the ventilation closure system. As discussed further below, the transition from the first state to the second state can involve bending, twisting, and/or elongating the SMA. Thus, the SMA actuator can include a torque tube, a camshaft, a spring, or a combination thereof.

In a particular implementation, the shape change of the SMA actuator is reversible based on the temperature of the SMA. That is, the SMA actuator is in the second state when the temperature of the SMA actuator is greater than the memory temperature of the SMA, and the SMA actuator is in the first state when the temperature of the SMA actuator is less than the memory temperature of the SMA. When the SMA actuator is used to quench an exothermic reaction, as described further below, this temperature-based reversible state change can lead to oscillation in the system. For example, if the SMA actuator closes a damper due to heat from an exothermic reaction in a compartment, the closed damper can limit airflow to the compartment and thereby reduce the extent of the exothermic reaction. As a result, the exothermic reaction releases less heat, which may allow the temperature of the SMA actuator to fall below the memory temperature of the SMA. If the temperature of the SMA actuator falls below the memory temperature of the SMA, the SMA actuator can reopen the damper, which can increase airflow to the compartment and re-energize the exothermic reaction. To reduce or eliminate such oscillations, particular implementations disclosed herein include a heating device. The heating device can be configured to heat the SMA actuator while the SMA actuator is in a position that closes the damper. In such implementations, the SMA actuator can cause the damper to close responsive to heat released by the exothermic reaction and can cause the damper to remain closed, despite a decrease in a rate the that exothermic reaction releases heat, due to heat from the heating device. Additionally, or in the alternative, the heating device can be used to close the damper when no exothermic reaction is present in the compartment, or when an exothermic reaction in the compartment is not sufficiently energetic to heat the SMA actuator to the memory temperature of the SMA. For example, the heating device can be coupled to a switch that can be manually actuated to cause the SMA actuator to close the damper. As another example, the heating device can be coupled to control circuitry or to a fire detection and suppression system that can activate the heating device responsive to some sensed condition indicating the possibility of a fire or other exothermic reaction.

Using the SMA actuator to respond to heat from the exothermic reaction enables the ventilation closure system to mitigate the exothermic reaction without relying on active systems that could be damaged by the exothermic reaction or a result of circumstances that led to the exothermic reaction. Thus, using the SMA actuator to mitigate the exothermic reaction increases safety both by allowing the airflow to ventilate the compartment when there is no exothermic reaction and by passively closing or limiting ventilation of the compartment when an exothermic reaction is present.

In some circumstances, a compartment that stores flammable or combustible materials also includes a fire detection system, a fire suppression system, or both. A fire suppression system is used to release a fire suppression agent into the compartment in response manual activation or in response to conditions that indicate that a fire may be present, such as smoke, heat, light, etc. A fire suppression agent usually works by displacing oxygen in the compartment in order to reduce available oxidizer for the exothermic reaction or chemically reacting with one of the reactants (e.g., the fuel or the oxidizer). However, if the compartment remains highly ventilated when the fire suppression agent is released into the compartment, the fire suppression agent can be flushed from the compartment by the ventilation system, which reduces the effectiveness of the fire suppression agent. In one implementation, the fire suppression system and a ventilation closure system that includes a damper and a SMA can be initiated concurrently or cooperatively such that the airflow in the compartment is reduced in response to or before the fire suppression system discharges the fire suppression agent. In such implementations, obstructing airflow through the ventilation system increases a residence time of the fire suppression agent in the compartment to more effectively quench the fire or other exothermic reaction.

FIG. 1 is a diagram 100 illustrating an example of an assembly 102 that includes a compartment 104 configured to store, use, or otherwise be associated with a flammable or combustible material. In a particular example, the assembly 102 is a vehicle or a portion of a vehicle, and the compartment 104 is an area within the vehicle, such as an engine compartment of an automobile or an aircraft, a fan compartment of an aircraft engine, etc. In another example, the assembly 102 is part of a building or another structure, and the compartment 104 is an area with the building or structure that is associated with storage or use of a combustible material or flammable material.

The assembly 102 includes a ventilation system 130 to ventilate the compartment 104. The ventilation system 130 includes one or more ducts 106 coupled to the compartment 104 to provide airflow through the compartment 104 to reduce the concentration of flammable or combustible vapors within the compartment 104. The ventilation system 130 can be a forced air system, in which case one or more fans are coupled to the duct(s) 106, or the ventilation system 130 can be a passive airflow system without fans.

The ventilation system 130 also includes a ventilation closure system 108. The ventilation closure system 108 includes a damper 110 and a shape memory alloy (SMA) actuator 112 that is coupled to the damper 110 and coupled to the duct(s) 106. The SMA actuator is configured to have two states. In a first state of the SMA actuator 112, the damper 110 is positioned to permit airflow in the duct 106, and in a second state of the SMA actuator 112, the damper 110 is positioned to obstruct airflow in the duct 106.

The SMA actuator 112 is in thermal communication with the compartment 104 and configured to change from the first state to the second state responsive to the SMA actuator 112 attaining a first temperature (e.g., a memory temperature of material of the SMA actuator 112). For example, the SMA actuator 112 can attain the first temperature responsive to heat 118 released by an exothermic reaction 116 in the compartment 104, responsive to heat from a heating device 114, or both. To illustrate, in response to a fire in the compartment 104, where fire is an example of a particular type of exothermic reaction 116, the duct 106 or another heat transfer medium, such as air, may transfer the heat 118 to the SMA actuator 112 in sufficient quantity and at a sufficient rate that the SMA actuator 112 attains the first temperature. In this illustrative example, when the SMA actuator 112 attains the first temperature, the SMA actuator 112 changes shape in order to close or partially close the damper 110 to obstruct airflow through the duct 106.

The ventilation closure system 108 can also include the heating device 114. The heating device 114 can include a resistive heating element, heat tape, a radiative heating element, or another heating device coupled to the SMA actuator 112. The heating device 114 is configured to heat the SMA actuator 112 in order to cause the SMA actuator 112 to transition to the second state or to cause the SMA actuator 112 to remain in the second state.

In FIG. 1, the assembly 102 also includes control circuitry 120. The control circuitry 120 can be configured to detect a position of the damper 110, detect the exothermic reaction 116 in the compartment 104, or detect other information to make a determination as to when to activate the heating device 114. In a particular example, the control circuitry 120 is configured to detect information indicating that the SMA actuator 112 is in the second state and to activate the heating device 114 in response to detecting the information. In this example, the information indicating that the SMA actuator 112 is in the second state can include damper state information indicating that the damper 110 is positioned to obstruct the airflow in the duct 106, airflow or air pressure information indicating a reduction in airflow in the duct 106, temperature information indicating the temperature of the SMA actuator 112, etc. Additionally, or in the alternative, the control circuitry 120 is configured to detect information indicating that the SMA actuator 112 should be in the second state. Information indicating that the SMA actuator 112 should be in the second state can include a temperature in the compartment 104 that exceeds a threshold temperature, or other information indicating that the exothermic reaction 116 is occurring in the compartment 104.

The control circuitry 120 is configured to send a control signal to the heating device 114 or to a switch associated with the heating device 114 in order to activate the heating device 114 to provide heat to the SMA actuator 112. While the heating device 114 is activated, the SMA actuator 112 remains in the second state such that the damper 110 is positioned to obstruct the airflow in the duct 106. Positioning the damper 110 to obstruct the airflow in the duct 106 reduces the oxygen that is available to sustain the exothermic reaction 116, and thus the exothermic reaction 116 can be quenched. Activating the heating device 114 causes the damper 110 to remain in the position to obstruct the airflow despite a reduction in heat 118 provided by the exothermic reaction 116 to the SMA actuator 112. By preventing the SMA actuator 112 from reverting to the first state, in which the damper 110 permits airflow in the duct 106, the heating device 114 reduces the likelihood that increased airflow could reignite the exothermic reaction 116.

Figure 2:
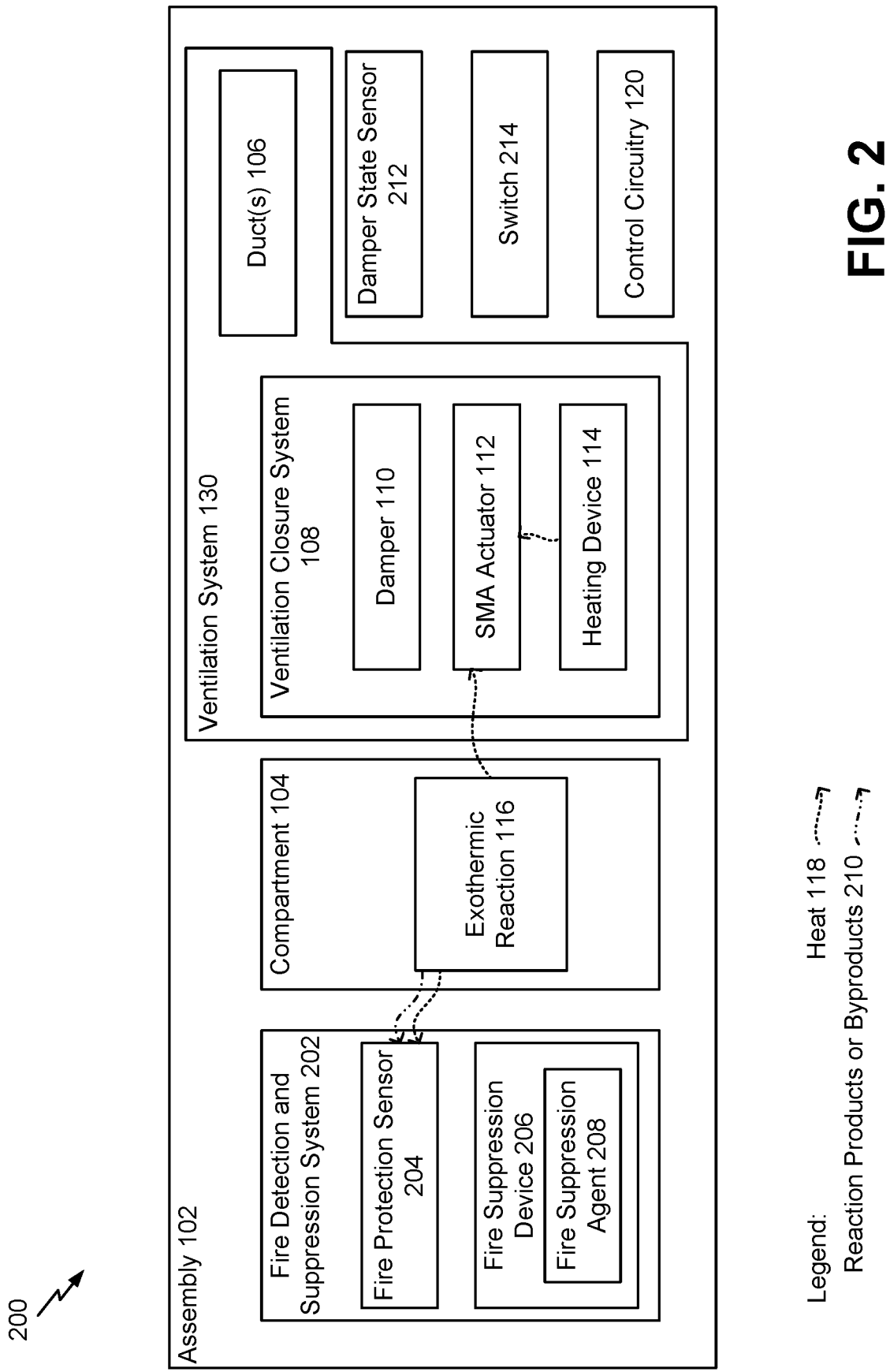
FIG. 2 is a diagram of an example of the assembly of FIG. 1 including an associated fire detection and suppression system.

FIG. 2 is a diagram 200 of an example of the assembly 102 of FIG. 1 including an associated fire detection and suppression system 202. In FIG. 2, the assembly 102 includes the compartment 104, the control circuitry 120, and the ventilation system 130, which includes the ventilation closure system 108 and the ducts 106, each of which is the same as previously described with reference to FIG. 1.

The fire detection and suppression system 202 includes one or more fire protection sensors 204 and a fire suppression device 206. The fire suppression device 206 is configured to provide a fire suppression agent 208 to the compartment 104 under particular circumstances. The fire protection sensor(s) 204 are configured to detect conditions indicative of a fire or other exothermic reaction 116 of concern in the compartment 104 and to generate sensor data based on the detected conditions. For example, the fire protection sensor(s) 204 can include a sensor to detect smoke or other fire-related particulate, a sensor to detect heat 118 released by the exothermic reaction 116, a sensor to detect light related by the exothermic reaction 116, a sensor to detect reaction products or byproducts 210 of the exothermic reaction 116 (such as a carbon dioxide sensor), or other sensors.

Additionally, in the implementation illustrated in FIG. 2, the assembly 102 includes a damper state sensor 212 and a switch 214. The switch 214 can be actuated to activate the heating device 114 in order to cause the SMA actuator 112 to change to (or remain in) the second state such that the damper 110 obstructs the airflow in the duct 106. For example, in order to manually actuate the ventilation closure system 108, a user can actuate the switch 214 to turn on the heating device 114 to cause the SMA actuator 112 to close or partially close the damper 110. In this example, the user can activate the switch 214 responsive to awareness of the exothermic reaction 116 in the compartment 104 or for another reason in order to obstruct airflow in the ventilation system 130.

The fire suppression agent 208 is chemical selected to suppress the exothermic reaction 116. Airflow through the compartment 104 can be reduced to increase the residency time of the fire suppression agent 208 in the compartment 104. Operation of the ventilation closure system 108 and the fire suppression device 206 can be coordinated such that the ventilation closure system 108 obstructs airflow in the ventilation system 130 before or in response to activation of the fire suppression device 206. For example, the fire detection and suppression system 202 can be coupled to or included within the control circuitry 120. In this example, the fire detection and suppression system 202 sends a command or signal to the control circuitry 120 to cause the control circuitry 120 to activate the heating device 114 in order to obstruct airflow through the duct 106 in response to activation of the fire suppression device 206 or in preparation for activation of the fire suppression device 206. In another example, the control circuitry 120 can be coupled to the damper state sensor 212. In this example, the damper state sensor 212 provides a command or signal to the control circuitry 120 that indicates a position of the damper 110. The control circuitry 120 can send a command or signal to the fire detection and suppression system 202 indicating that airflow is reduced by the damper 110 based on the command or signal from the damper state sensor 212 indicating that the damper 110 is in position to obstruct the airflow through the duct 106.

As specific example, during normal operation (e.g., in the absence of the exothermic reaction 116), airflow is provided through the duct 106 via the ventilation system 130 into the compartment 104. At some point in time, the exothermic reaction 116 can be initiated, which releases the heat 118 and may also release the reaction products or byproducts 210. As a result of the heat 118 released by the exothermic reaction 116, the SMA actuator 112 can change from the first state (in which the damper 110 is positioned to permit airflow in the duct 106) to the second state (in which the damper 110 is positioned to obstruct the airflow through the duct 106). In this circumstance, the damper state sensor 212 detects the change in position of the damper 110 as a result of the SMA actuator 112 changing to the second state. The damper state sensor 212 provides the signal or command to the control circuitry 120 indicating that the damper 110 is positioned to obstruct airflow in the duct 106. The control circuitry 120 subsequently provides a signal or command to the fire detection and suppression system 202 in order to cause the fire detection and suppression system 202 to activate the fire suppression device 206. Activation of the fire suppression device 206 can include dispensing the fire suppression agent 208 into the compartment 104 or activating a fire protection sensor 204 to determine whether to activate the fire suppression device 206 to dispense the fire suppression agent 208.

Alternatively or in addition to operations described above, in some circumstances, the fire detection and suppression system 202 may detect the exothermic reaction 116 before the SMA actuator 112 receives sufficient heat 118 to change from the first state to the second state. In such circumstances, the fire protection sensor 204 can detect the heat 118 or the reaction of products or byproducts 210 of the exothermic reaction 116. In response to detecting the heat 118 or the reaction products or byproducts 210, the fire protection sensor 204 generates a signal or command indicating the presence of the exothermic reaction 116. The signal or command can be provided to the fire suppression device 206 to activate dispensing of the fire suppression agent 208, can be provided to the control circuitry 120, or can be provided to both fire suppression device 206 and the control circuitry 120. As a particular example, the fire protection sensor 204 can provide a command or signal to the control circuitry 120 indicating the presence of the exothermic reaction 116. In this example, the control circuitry 120 can activate the heating device 114 to provide additional heat 118 to the SMA actuator 112 in order to change the SMA actuator 112 from a first state to a second state to position the damper 110 to obstruct airflow on the duct 106. In some implementations, the control circuitry 120 can send a signal to the fire detection and suppression system 202 confirming that the airflow in the duct 106 is obstructed responsive to the control circuitry 120 activating the heating device 114, responsive to the signal or command from the damper state sensor 212, or both. The fire detection and suppression system 202 can activate the fire suppression device 206 concurrently with or after sending the command to the control circuitry 120, or after receiving a response from the control circuitry 120 indicating that the airflow in the duct 106 is obstructed. In other implementations, the order of steps performed by the assembly 102 can be different. For example, the fire suppression device 206 can dispense the fire suppression agent 208 into the compartment 104 prior to or without receiving confirmation from the control circuitry 120 that the damper 110 is positioned to obstruct airflow in the duct 106.

In some implementations, the ventilation closure system 108 can be configured to reopen (e.g., permit airflow into the compartment 104) after the exothermic reaction 116 is sufficiently quenched. For example, the fire protection sensor(s) 204, the fire detection and suppression system 202, or the control circuitry 120 may determine, based on sensor data from the fire protection sensor(s) 204, that the exothermic reaction 116 has stopped or is controlled. Based on determining that the exothermic reaction 116 has stopped or is controlled, the control circuitry 120 can generate a deactivation signal. The deactivation signal causes the heating device 114 to be deactivated. After the heating device 114 is deactivated, the SMA actuator 112 will begin to cool, and will eventually attain a temperature at which the SMA actuator 112 changes from the second state to the first state. In some implementations, the SMA actuator 112 can change from the first state to the second state at a first temperature (a first memory temperature) and can change from the second state to the first state at a second temperature (a second memory temperature) that is different from the first temperature.

In some implementations, the switch 214 can be a three position switch including a passive activation position, a supplemental activation position, and an on position. In such implementations, when the switch 214 is in the passive activation position, the heating device 114 is deactivated and remains deactivated even if the SMA actuator 112 is actuated responsive to the heat 118 of the exothermic reaction 116. Thus, when the switch 214 is in the passive activation position, the ventilation closure system 108 only responds passively to the exothermic reaction 116. In contrast, when the switch 214 is in the supplemental activation position, the heating device 114 is deactivated in the absence of the exothermic reaction 116 but is activated if the SMA actuator 112 is actuated responsive to the heat 118 of the exothermic reaction 116. In some implementations, the heating device 114 can also be activated in response to detection of the exothermic reaction 116 by the fire protection sensor 204. When the switch 214 is in the on position, the heating device 114 is activated irrespective of whether the exothermic reaction 116 is present in the compartment 104.

Figure 3:
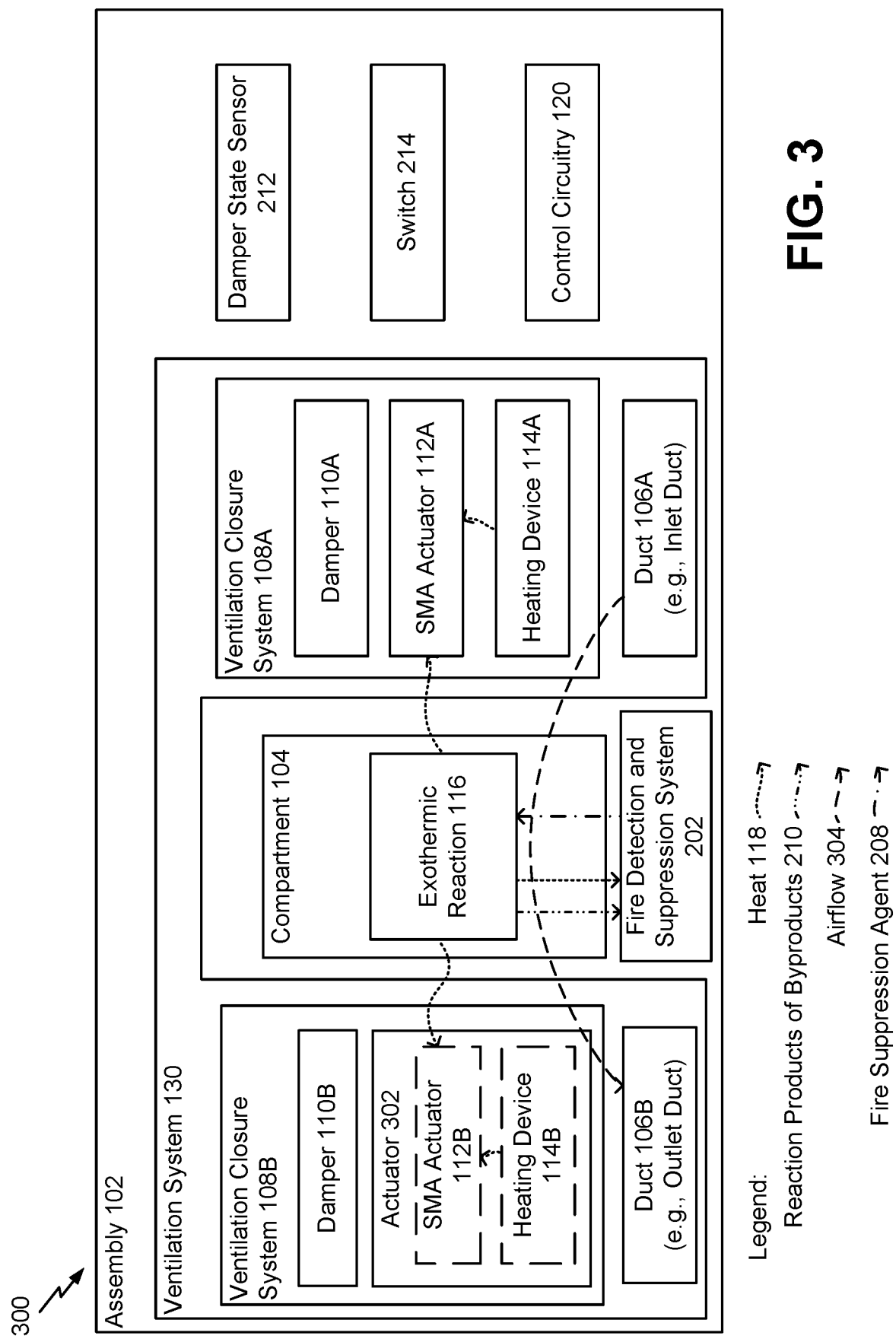
FIG. 3 is a diagram of an example of the assembly of FIG. 1 or FIG. 2 in which the ventilation system includes inlet and outlet components.

FIG. 3 is a diagram 300 of an example of the assembly 102 of FIG. 1 or FIG. 2 in which the ventilation system 130 includes inlet and outlet components. The assembly 102 in FIG. 3 includes each of the features illustrated in FIG. 2 and, in addition, includes both an inlet duct (duct 106A) and an outlet duct (duct 106B). In this implementation, the duct 106A is associated with a ventilation closure system 108A and the duct 106B is associated with a ventilation closure system 108B. Although FIG. 3 illustrates the fire detection and suppression system 202, the switch 214, and the damper state sensor 212, in some implementations, the assembly 102 includes the duct 106A and the duct 106B without one or more of the fire detection and suppression system 202, the switch 214, or the damper state sensor 212. For example, the duct 106A and the duct 106B can be included in the assembly 102 of FIG. 1.

In FIG. 3, the ventilation closure system 108A includes a damper 110A, a SMA actuator 112A, and a heating device 114A. The damper 110A, the SMA actuator 112A, and the heating device 114A are the same as illustrated and described with reference to FIGS. 1 and 2.

The ventilation closure system 108B includes at least a damper 110B and an actuator 302. In some implementation, the actuator 302 includes a second SMA actuator 112B and a second heating device 114B. Alternatively, the actuator 302 can be a non-SMA actuator, such as a pneumatic actuator, an electrical actuator, or another actuator that is not directly responsive to the heat 118 of an exothermic reaction 116 in the compartment 104. In such implementations, the actuator 302 can be activated by the control circuitry 120, the fire detection and suppression system 202, the switch 214, or any combination thereof. Although in some implementations of the ventilation system 130 the SMA actuator 112A is part of the ventilation closure system 108A associated with the inlet duct 106A and a non-SMA actuator is included as part of the ventilation closure system 108B associated with the outlet duct 106B, in other implementations, the ventilation closure system 108B associated with the outlet duct 106B includes the SMA actuator 112B, and the ventilation closure system 108A associated with the inlet duct 106A includes a non-SMA actuator.

During normal operation (e.g., in the absence of the exothermic reaction 116 in the compartment 104), airflow 304 enters the compartment 104 from the inlet duct 106A and exits the compartment 104 through the outlet duct 106B. When the exothermic reaction 116 is present in the compartment 104, the heat 118 released by the exothermic reaction 116 can cause the SMA actuator 112A, the SMA actuator 112B, or both, to change to the second state such that the damper 110A obstructs airflow in the inlet duct 106A, such that the damper 110B obstructs airflow in the outlet duct 106B, or both. In some implementations, the SMA actuator 112A, the actuator 302 (which can be an SMA actuator or a non-SMA actuator), or both, can be activated by the fire detection and suppression system 202.

The ventilation closure system 108A associated with the inlet duct 106A and the ventilation closure system 108B associated with the outlet duct 106B can be configured to operate cooperatively. For example, if both of the ventilation closure systems 108 include SMA actuators 112 and heating devices 114, activation of either of the heating devices 114 can cause the other heating device 114 to be activated. As another example, regardless of whether both of the ventilation closure systems 108 include SMA actuators 112 and heating devices 114, if one damper 110 is positioned to obstruct the airflow 304 in a duct 106, the other ventilation closure system 108 can be activated to cause its damper 110 to obstruct the airflow 304 in the other duct 106. To illustrate, if the fire detection and suppression system 202 detects the exothermic reaction 116 in the compartment 104, the fire detection and suppression system 202 can send a signal to the control circuitry 120, to the actuator 302, or both. In this illustrative example, the signal can cause the actuator 302 to position the damper 110B to obstruct the airflow 304. Additionally, either in response to the signal from the fire detection and suppression system 202 or in response to detecting that the damper 110B is positioned to obstruct the airflow 304, the control circuitry 120 can activate the heating device 114A to cause the SMA actuator 112A to position the damper 110A to also obstruct the airflow 304.

As another illustrative example, the SMA actuator 112A can receive sufficient heat 118 from the exothermic reaction 116 to attain a temperature that causes the SMA actuator 112A to change from the first state to the second state, thereby causing the damper 110A to be positioned to obstruct the airflow 304. In response to detecting the change of state of the SMA actuator 112A, the temperature of the SMA actuator 112A, the position of the damper 110A, or obstruction of the airflow 304, the control circuitry 120 can activate the heating device 114A to maintain the SMA actuator 112A in the second state. Additionally, the control circuitry 120 can send a signal to the actuator 302 to cause the actuator 302 to position the damper 110B to obstruct the airflow 304. Alternatively, the actuator 302 may be activated responsive to a signal from the damper state sensor 212 indicating that the damper 110A is positioned to obstruct the airflow 304.

Figure 4:
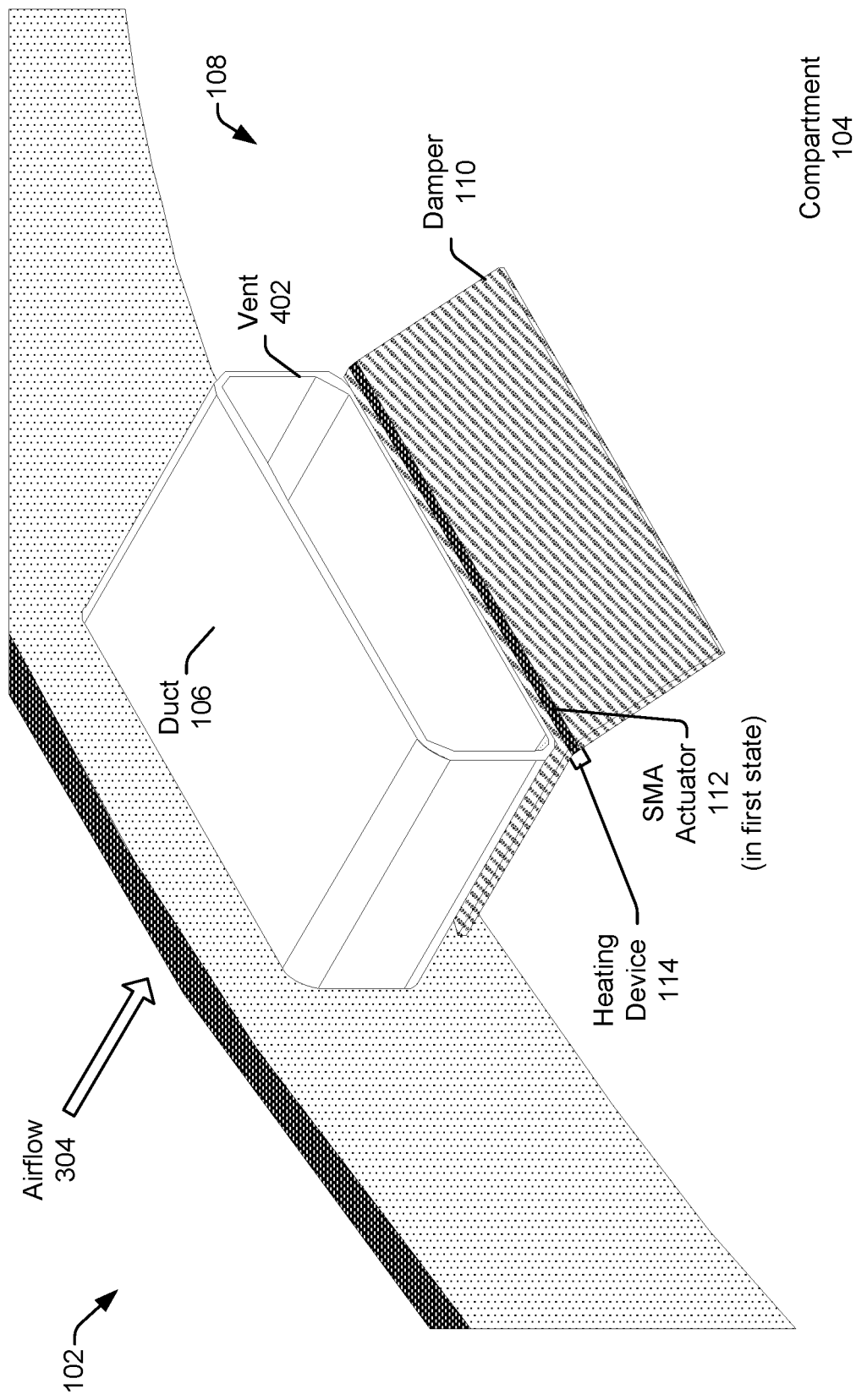
FIG. 4 is a perspective diagram of an example of a portion of the ventilation closure system of any of FIG. 1, 2, or 3 in a first state.

FIG. 4 is a perspective diagram of an example of a portion of the ventilation closure system 108 of any of FIG. 1, 2, or 3 in a first state (e.g., with the SMA actuator 112 in the first state). In the particular implementation illustrated at FIG. 4, the assembly 102 includes the duct 106, the SMA actuator 112 coupled to the duct 106 and to the damper 110, and a heating device 114 coupled to the SMA actuator 112. The duct 106 includes a vent 402 through which the airflow 304 enters the compartment 104.

In FIG. 4, the SMA actuator 112 is illustrated in the first state. In the first state of the SMA actuator 112, the damper 110 is positioned to permit the airflow 304 into the compartment 104. A particular implementation illustrated in FIG. 4, the SMA actuator 112 is coupled to a hinge region of the damper 110. In this example, the damper 110 includes a base portion coupled to the duct 106 and a flapper portion coupled to the SMA actuator 112 and configured to close or partially close to obstruct the airflow 304.

Figure 5:
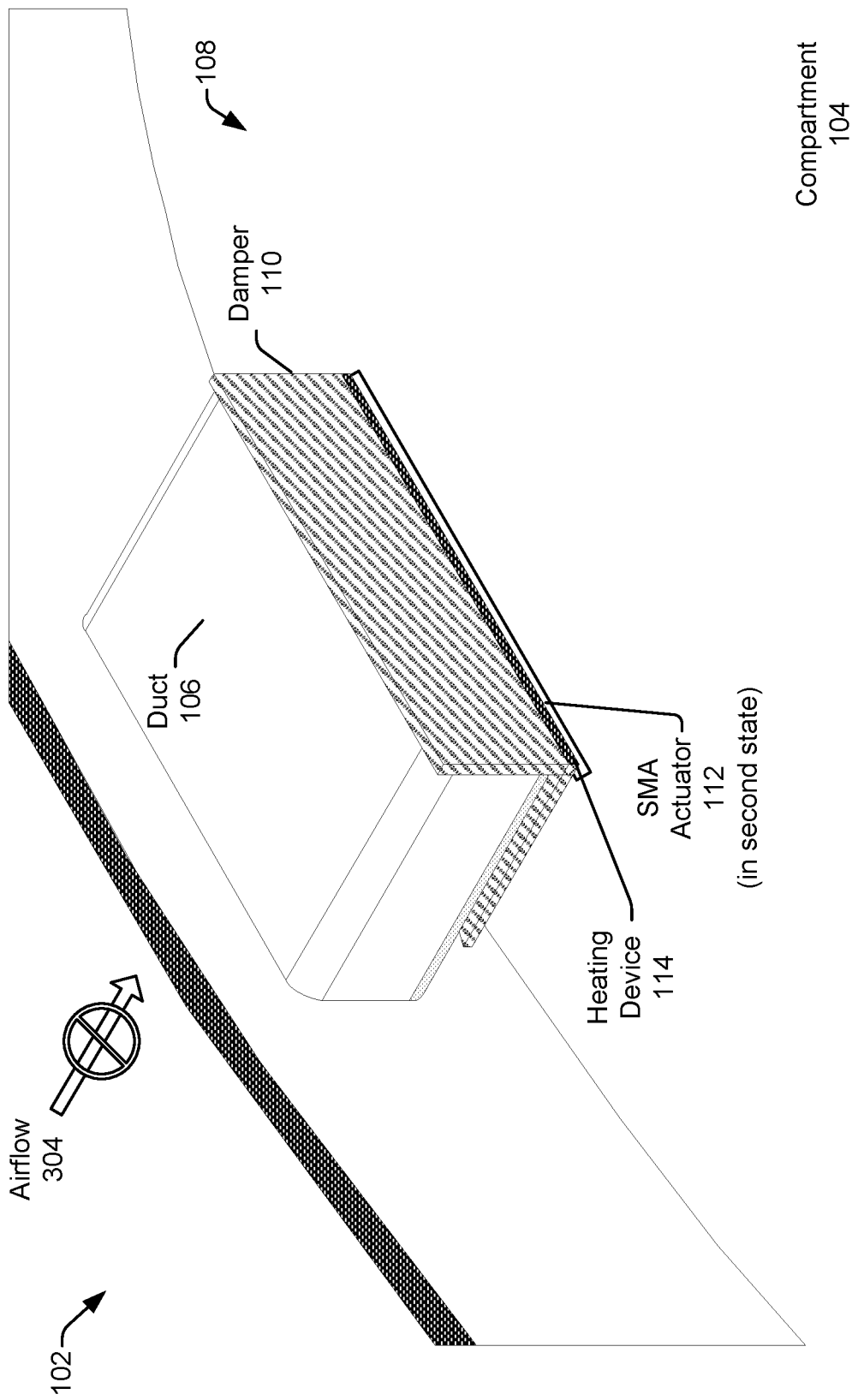
FIG. 5 is a perspective diagram of the example of FIG. 4 in a second state.

FIG. 5 is a perspective diagram of the example of FIG. 4 in a second state (e.g., with the SMA actuator 112 in the second state). When the SMA actuator 112 is in the second state, the damper 110 is positioned to obstruct the airflow 304 through the duct 106. Although FIG. 5 illustrates the damper 110 fully closed to completely block the airflow 304, in other examples, the damper 110 partially closes thereby reducing the airflow 304 or inhibiting the airflow 304 but not completely blocking the airflow 304 into the compartment 104.

Figure 6:
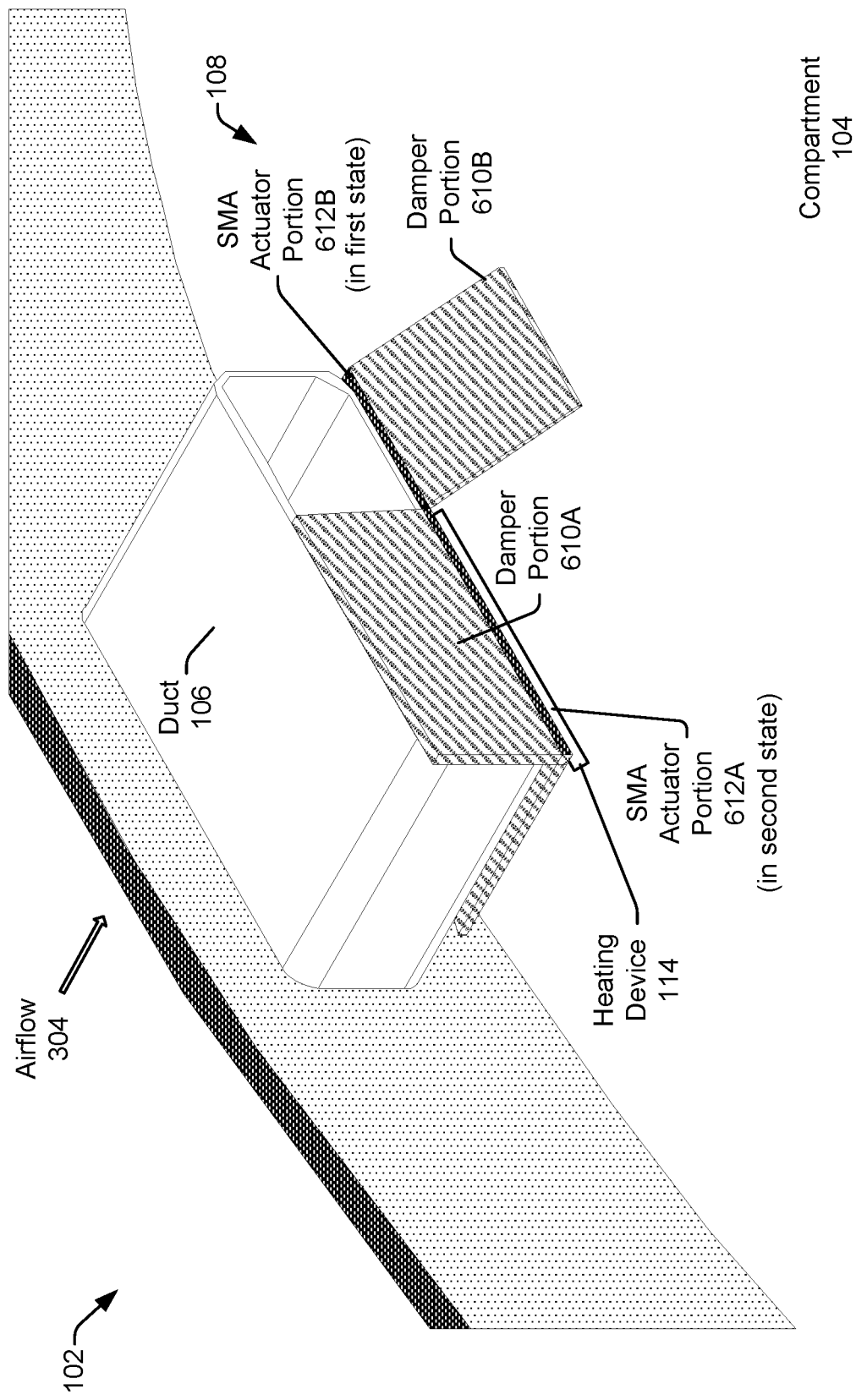
FIG. 6 is a perspective diagram of another example of a portion of the ventilation closure system of any of FIG. 1, 2, or 3.

FIG. 6 is a perspective diagram of another example of a portion of the ventilation closure system 108 of any of FIG. 1, 2, or 3. In FIG. 6, the damper 110 is divided into a first damper portion 610A and a second damper portion 610B. The first damper portion 610A is coupled to the duct 106 via a SMA actuator portion 612A, and the second damper portion 610B is coupled to the duct 106 via a second SMA actuator portion 612B.

The SMA actuator portions 612A and 612B can have different memory temperatures. In FIG. 6, the SMA actuator portion 612A is in the second state such that the first damper portion 610A is positioned to obstruct the airflow 304, and the second SMA actuator portion 612B is in the first state such that the second damper portion 610B is positioned to permit the airflow 304. Thus, at the particular temperature experienced in the circumstances illustrated in FIG. 6, the airflow 304 into the compartment 104 is reduced but not completely blocked by use of the SMA actuator portions 612A and 612B in conjunction with the damper portions 610A and 610B. At a higher temperature (e.g., a temperature greater than the memory temperature of the second SMA actuator portion 612B), the airflow 304 into the compartment 104 may be further obstructed (e.g., completely blocked or more fully blocked) by the damper portions 610A and 610B.

In the particular implementation illustrated in FIG. 6, the heating device 114 can be coupled to one of the SMA actuator portions 612A, 612B, or to both of the SMA actuator portions 612A and 612B. Alternatively, each of the SMA actuator portions 612A, 612B can have its own heating device 114.

While the examples illustrated in FIGS. 4-6 show a flapper-type damper 110, other types of dampers can also or in the alternative be used. FIGS. 7A-7D illustrate examples of other types of dampers 110 having different shapes and form factors which may be more convenient for particular types of use or in particular types of ducts 106. Each of FIGS. 7A-7C illustrate round dampers, and FIG. 7D illustrates a rectangular damper; however, any of the illustrated damper types can be used with other form factors.

FIG. 7A illustrates a radial damper 110C. The radial damper 110C includes a plurality of blades 702 arranged around a central hub 704. The radial damper 110C can be closed via rotation of the blades 702 relative to the hub 704 in a first direction and can be opened via rotation of the blades 702 relative to the hub 704 in an opposite direction. In FIG. 7A, an SMA actuator 112C is coupled to the blades 702 in an area corresponding to the hub 704. The SMA actuator 112C is configured to rotate the blades 702 when the SMA actuator changes states. For example, the SMA actuator 112C can be a torque tube or spring type actuator that generates rotational motion when the state of the SMA changes. A heating device 114C is coupled to the SMA actuator 112C, the blades 702, the hub 704, or a combination thereof.

FIG. 7B illustrates an irising damper 110D that includes a plurality of blades 706 arranged to enlarge a central opening 708 of the damper 110D responsive to rotation of a ring (not shown, but positioned behind the SMA actuator 112D in the view illustrated) in a first direction, and to reduce the central opening 708 of the damper 110D responsive to rotation of the ring in an opposite direction. In FIG. 7B, the SMA actuator 112D is coupled to the ring and to a housing 710 of the damper 110D and is configured to rotate the ring relative to the housing 710 when the SMA actuator 112D changes states. Thus, the SMA actuator 112D is configured to provide rotary motion. For example, the SMA actuator 112D can be a torque tube or spring type actuator. In FIG. 7B, the heating device 114D is coupled to or positioned around the SMA actuator 112D.

In some implementations, the damper 110D includes a tab 712 that can be moved to move the ring and thereby to enlarge or reduce the opening 708. In such implementations, the SMA actuator 112D can be coupled to the tab 712 and configured to generate linear or nearly linear motion to open or close the damper 110D. In such implementations, the SMA actuator 112D can include a camshaft or spring type actuator.

FIG. 7C illustrates a butterfly damper 110E that includes a pair of blades 716 coupled to a hinge 714. The hinge 714 is coupled to a housing 713 of the damper 110E. An SMA actuator 112E is coupled to the hinge 714, to the blades 716, or to both. The hinge 714 allows the blades 716 to rotate to open or close the damper 110E. The SMA actuator 112E is configured to change an angle between the blades 716 (by rotating one or both blades 716 about the hinge 714). The SMA actuator 112E can change the angle between the blades 716 via linear motion or rotary motion, depending on how the SMA actuator 112E is coupled to the blades 716 and the hinge 714. In FIG. 7C, a heating device 114E is coupled to the SMA actuator 112E, to the hinge 714, to the blades 716, or a combination thereof. Although FIG. 7C illustrates the SMA actuator 112E as directly coupled to the blades 716, in other implementations, the SMA actuator 112E can be disposed on an exterior surface of the housing 713 and a linkage can extend through the housing 713 to couple the SMA actuator 112E to the blades 716. In such implementations, the heating device 114E can also be disposed outside the housing 713.

FIG. 7D illustrates a louvre or blade damper 110F. The damper 110F includes a blade 718 pivotally coupled to a housing 720. Pivoting the blade 718 in a first direction closes the damper 110F and pivoting the blade 718 in the opposite direction opens the damper 110F. Although only one blade 718 is illustrated in FIG. 7D, some louvre type dampers may include more than one blade 718.

An SMA actuator 112F is coupled to the blade 718 to pivot the blade 718. In the example illustrated in FIG. 7D, a heating device 114F is disposed external to the housing 720 and thermally coupled to the SMA actuator 112F.

Figure 8:
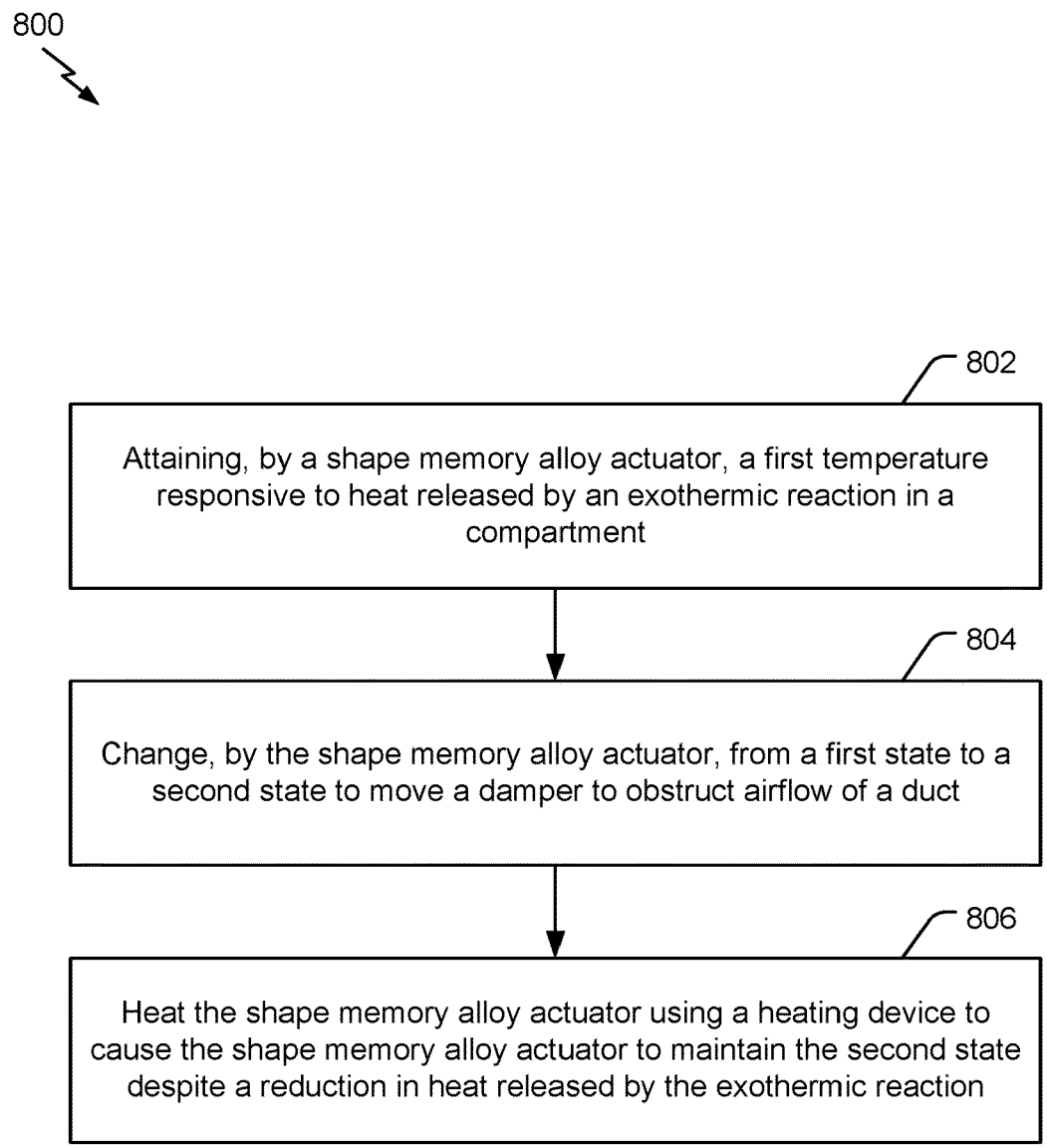
FIG. 8 is a flowchart depicting a method of fire control for a compartment using the ventilation closure system of any of FIG. 1, 2, or 3.

FIG. 8 is a method 800 of fire control for a compartment using the ventilation closure system of any of FIG. 1, 2, or 3. For example, the method 800 uses an SMA actuator (e.g., the SMA actuator 112 of any of FIGS. 1-7D). As described above, the SMA actuator 112 has a first state in which airflow of a duct (e.g., the duct 106 of any of FIGS. 1-6) associated with the compartment is unobstructed by a damper (e.g., the damper 110 of any of FIGS. 1-7D) and having a second state in which the damper obstructs the airflow of the duct.

The method 800 includes, at 802, while the SMA actuator is in the first state, attaining, by the SMA actuator, a first temperature responsive to heat released by an exothermic reaction in the compartment. The first temperature is greater than or equal to the memory temperature of the SMA of the SMA actuator.

The method 800 also includes, at 804, responsive to attaining the first temperature, changing, by the SMA actuator, from the first state to the second state to move the damper to obstruct airflow of the duct. For example, the SMA actuator can bend, unbend, twist, untwist, elongate, or change shape in some other manner in response to changing states. The SMA actuator can be directly coupled to a portion of the damper (such as to a flapper, a blade, or a hinge), or coupled to a mechanical linkage that is coupled to the portion of the damper, such that the changing shape of the SMA actuator causes the damper to move to obstruct the airflow in the duct.

The method 800 also includes, at 806, after changing from the first state to the second state, heating the shape memory alloy actuator using a heating device coupled to the shape memory alloy actuator. For example, the heating device 114 of any of FIGS. 1-7D can heat the SMA actuator 112 to cause the SMA actuator to remain in the second state despite a reduction in heat released by the exothermic reaction. In some implementations, as described above, the heating device 114 can be activated to cause the SMA actuator 112 to change from the first state to the second state. For example, the heating device 114 can be manually activated. To illustrate, the method 800 can include activating the heating device responsive to activation of a flight deck switch. Alternatively, or in addition, the heating device 114 can be activated by the control circuitry 120 of FIGS. 1-3 or by the fire detection and suppression system 202 of FIG. 2 or 3. In implementations in which the heating device 114 is manually activated or activated by the control circuitry 120 or the fire detection and suppression system 202, the heating device 114 can remain active after the SMA actuator 112 changes to the second state to maintain the SMA actuator 112 in the second state.

In some implementations, the method 800 can also include dispersing a fire suppression agent into the compartment while the shape memory alloy actuator is in the second state. For example, the duct can be coupled in flow communication with the compartment and obstructing airflow in the duct can increase the residency time of the fire suppressant in the compartment.

In some implementations, the method 800 includes generating, by a control circuitry, an activation signal based on sensor data from a fire protection sensor of the compartment. The sensor data can indicate, for example, one or more of a temperature in the compartment, detection of reaction products the exothermic reaction, or detection of reaction byproducts of the exothermic reaction. In such implementations, the method 800 further includes activating the heating device based on the activation signal. In some such implementations, the method 800 can also include generating, by the control circuitry, a deactivation signal based on the sensor data from the fire protection sensor. For example, when the fire protection sensor 204 of FIG. 2 indicates that the exothermic reaction 116 is sufficiently quenched (e.g., is no longer detected), the control circuitry 120 can generate a deactivation signal. In such implementations, the method 800 further includes deactivating the heating device responsive to the deactivation signal from the control circuitry, and, after deactivating the heating device, changing, by the shape memory alloy actuator, from the second state to the first state responsive to the shape memory alloy actuator attaining a second temperature. The second temperature can be the same as the first temperature, or can be different from the first temperature (e.g., if the SMA of the SMA actuator 112 has two-way memory).

In some implementations, the method 800 also includes receiving, from a damper state sensor, a state signal indicating that the damper is in a position corresponding to shape memory alloy actuator being in the second state. For example, the damper state sensor 212 of FIG. 2 or 3 can generate the state signal indicating that the damper 110 is closed, partially closed, or in another position that corresponds to the SMA actuator 112 being in the second state. In such implementations, the method 800 can include activating the heating device based on the state signal from the damper state sensor. In such implementations, when the heating device is activated, the heating device causes a temperature of the SMA actuator to be greater than or equal to the first temperature.

Thus, the method 800 improves the safety of use and storage of flammable or combustible materials. For example, in the absence of a fire or other exothermic reaction, a compartment that includes the flammable or combustible materials can be ventilated to reduce the build up of vapors. However, in the event that a fire or other exothermic reaction occurs in the compartment, the method 800 can be used to automatically, and passively (e.g., without complicated algorithms or controllers) respond to limit or reduce airflow to the compartment. Additionally, the method 800 reduces the risk of flare ups (e.g., reignition of a fire) that could occur if airflow were restored immediately after the fire of exothermic reaction is quenched.

Figure 9:
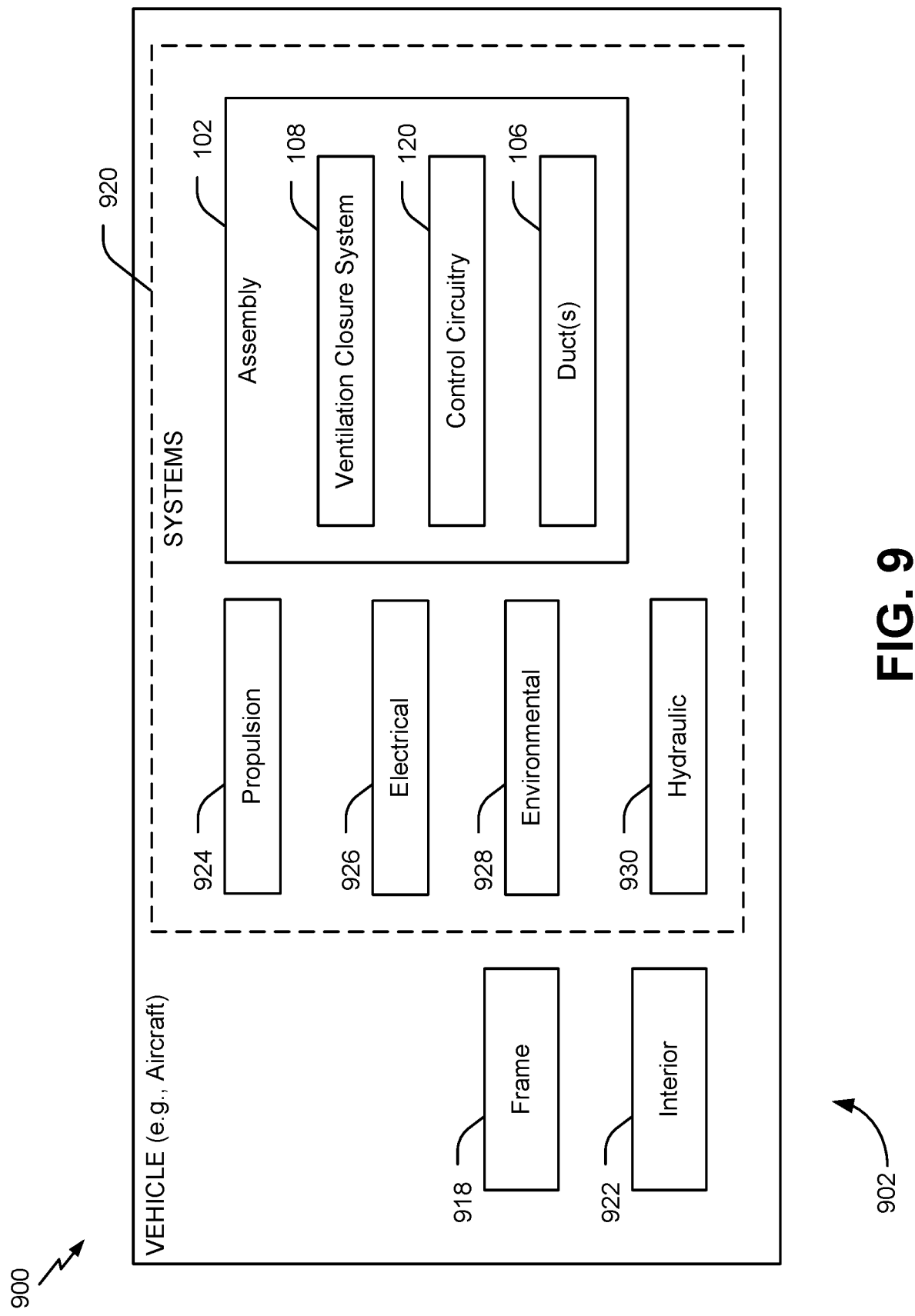
FIG. 9 is a block diagram that illustrates an example of a vehicle that includes the ventilation closure system of any of FIG. 1, 2, or 3.

FIG. 9 is a block diagram 900 that illustrates an example of a vehicle 902 that includes the assembly 102 and the ventilation closure system 108 of any of FIG. 1, 2, or 3. In some implementations, the vehicle 902 includes an aircraft. In other implementations, the vehicle 902 includes another type of vehicle, such as a land craft, a water craft, or a space craft. As shown in FIG. 9, the vehicle 902 includes a frame 918, an interior 922, and a plurality of systems 920. Examples of the plurality of systems 920 include one or more of a propulsion system 924, an electrical system 926, an environmental system 928, and a hydraulic system 930. The plurality of systems 920 also includes the assembly 102, which includes the duct 106, the ventilation closure system 108, and the control circuitry 120. In some implementations, the assembly 102 can also include other components described with reference to FIGS. 2 and 3, such as the damper state sensor 212, the switch 214, or the fire detection and suppression system 202.

Any number of other systems can also be included in the vehicle 902. Although a vehicle example is shown in FIG. 9, the present disclosure can be applied to other industries. For example, the assembly 102 can be used in a building or other structure.

Although one or more of FIGS. 1-9 illustrate systems, apparatuses, and/or methods according to the teachings of the disclosure, the disclosure is not limited to these illustrated systems, apparatuses, and/or methods. One or more functions or components of any of FIGS. 1-9 as illustrated or described herein may be combined with one or more other portions of another of FIGS. 1-9. Accordingly, no single implementation described herein should be construed as limiting and implementations of the disclosure may be suitably combined without departing form the teachings of the disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of fire control for a compartment using a shape memory alloy actuator, the shape memory alloy actuator having a first state in which airflow of a duct associated with the compartment is unobstructed by a damper and having a second state in which the damper obstructs the airflow of the duct, the method comprising:
while the shape memory alloy actuator is in the first state, attaining, by the shape memory alloy actuator, a first temperature responsive to heat released by an exothermic reaction in the compartment;
responsive to attaining the first temperature, changing, by the shape memory alloy actuator, from the first state to the second state to move the damper to obstruct airflow of the duct; and
after changing from the first state to the second state, heating the shape memory alloy actuator using a heating device coupled to the shape memory alloy actuator, wherein the heating causes the shape memory alloy actuator to maintain the second state despite a reduction in heat released by the exothermic reaction.

2. The method of claim 1, wherein the duct is coupled in flow communication with the compartment, the method further comprising dispersing a fire suppression agent into the compartment while the shape memory alloy actuator is in the second state.

3. The method of claim 1 further comprising activating the heating device responsive to activation of a switch.

4. The method of claim 1, wherein a fire protection sensor is associated with the compartment, the method further comprising:
generating, by control circuitry, an activation signal based on sensor data from the fire protection sensor, the sensor data indicating one or more of a temperature in the compartment, detection of reaction products the exothermic reaction, or detection of reaction byproducts of the exothermic reaction; and
activating the heating device based on the activation signal.

5. The method of claim 4 further comprising:
generating, by the control circuitry, a deactivation signal based on the sensor data from the fire protection sensor;
deactivating the heating device responsive to the deactivation signal from the control circuitry; and
after deactivating the heating device, changing, by the shape memory alloy actuator, from the second state to the first state responsive to the shape memory alloy actuator attaining a second temperature.

6. The method of claim 1 further comprising:
receiving, from a damper state sensor, a state signal indicating that the damper is in a position corresponding to shape memory alloy actuator being in the second state; and
activating the heating device based on the state signal from the damper state sensor, wherein, when activated, the heating device causes a temperature of the shape memory alloy actuator to be greater than or equal to the first temperature.

7. The method of claim 1, wherein the exothermic reaction is an oxidation reaction supported at least partially by oxygen in the airflow of the duct, and wherein moving the damper to obstruct the airflow of the duct limits oxygen available to the exothermic reaction and increases a residency time that a fire suppression agent remains in the compartment.

8. A ventilation closure system comprising:
a damper;
a shape memory alloy actuator having a first state in which the damper is positioned to permit airflow in a duct and having a second state in which the damper is positioned to obstruct the airflow in the duct, the shape memory alloy actuator configured to change from the first state to the second state responsive to the shape memory alloy actuator attaining a first temperature responsive to heat released by an exothermic reaction in a compartment associated with the duct; and
a heating device thermally coupled to the shape memory alloy actuator, the heating device configured to heat the shape memory alloy actuator to maintain the first temperature at the shape memory alloy actuator so that the shape memory alloy actuator remains in the second state.

9. The ventilation closure system of claim 8, wherein the damper is directly connected to the shape memory alloy actuator and the shape memory alloy actuator is directly connected to the duct.

10. The ventilation closure system of claim 8, wherein the damper corresponds to a flapper coupled to a vent of the duct.

11. The ventilation closure system of claim 8, wherein the damper includes or corresponds to a blade damper, a louvre damper, a butterfly damper, a radial damper, or a round damper.

12. The ventilation closure system of claim 8, wherein the shape memory alloy actuator comprises a torque tube, a camshaft, a spring, or a combination thereof.

13. The ventilation closure system of claim 8, further comprising a switch coupled to the heating device and configured to selectively activate the heating device independently of the position of the damper.

14. An assembly including a ventilation closure system, the assembly comprising:
a compartment;
a duct configured to provide airflow to the compartment;
a damper;
a shape memory alloy actuator having a first state in which the damper is positioned to permit the airflow in the duct and having a second state in which the damper is positioned to obstruct the airflow in the duct, the shape memory alloy actuator in thermal communication with the compartment and configured to change from the first state to the second state responsive to the shape memory alloy actuator attaining a first temperature responsive to heat released by an exothermic reaction in the compartment;
a heating device thermally coupled to the shape memory alloy actuator, the heating device configured to, when activated, heat the shape memory alloy actuator; and
control circuitry coupled to the heating device, the control circuitry configured to selectively activate the heating device to maintain the first temperature at the shape memory alloy actuator so that the shape memory alloy actuator remains in the second state.

15. The assembly of claim 14, further comprising a fire suppression device coupled to the control circuitry and configured to provide a fire suppression agent to the compartment responsive to a control signal from the control circuitry.

16. The assembly of claim 15, further comprising a fire protection sensor configured to generate sensor data indicating one or more of a temperature in the compartment, detection of reaction products of the exothermic reaction, or detection of reaction byproducts of the exothermic reaction, wherein the control circuitry is configured to generate control signals to activate the heating device, the fire suppression device, or both, based on the sensor data.

17. The assembly of claim 15, wherein the duct corresponds to an inlet duct of the compartment, the assembly further comprising:
   an outlet duct coupled to the compartment and configured to enable outlet airflow from the compartment;
   a second damper coupled to the outlet duct; and
   a second actuator coupled to the second damper, the second actuator configured to move the second damper between a first position in which the second damper permits the outlet airflow from the compartment and a second position in which the second damper obstructs the outlet airflow from the compartment,
   wherein the control circuitry is configured to activate the fire suppression device based on an indication that the second damper is in the second position or the control circuitry is configured to cause the second actuator to move the second damper to the second position based an indication to activate the fire suppression device.

18. The assembly of claim 14, wherein the duct includes an inlet duct for an engine compartment of an aircraft.

19. The assembly of claim 14, further comprising a damper state sensor coupled to the control circuitry, wherein the control circuitry is configured to activate the heating device based on receipt, from the damper state sensor, of a state signal indicating that the damper is positioned to obstruct airflow in the duct.

20. The assembly of claim 14, further comprising a switch coupled to control circuitry, wherein the control circuitry is further configured to activate the heating device based on actuation of the switch.

\* \* \* \* \*